United States Patent
Umeda et al.

(10) Patent No.: US 10,578,151 B2
(45) Date of Patent: Mar. 3, 2020

(54) ROLLING BEARING

(71) Applicant: MITSUBISHI HEAVY INDUSTRIES, LTD., Tokyo (JP)

(72) Inventors: Akihiko Umeda, Tokyo (JP); Shuichi Isayama, Tokyo (JP); Hiroyuki Tani, Tokyo (JP); Shigeyuki Mori, Tokyo (JP); Shinya Nakamura, Tokyo (JP); Toshihiro Omae, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 15/919,605

(22) Filed: Mar. 13, 2018

(65) Prior Publication Data

US 2019/0113070 A1    Apr. 18, 2019

(30) Foreign Application Priority Data

Oct. 16, 2017  (JP) .................................. 2017-200492

(51) Int. Cl.
*F16C 9/02* (2006.01)
*F16C 33/58* (2006.01)
*F16C 19/06* (2006.01)
*F16C 33/38* (2006.01)

(52) U.S. Cl.
CPC ................ *F16C 9/02* (2013.01); *F16C 19/06* (2013.01); *F16C 33/585* (2013.01); *F16C 33/3837* (2013.01); *F16C 2240/76* (2013.01); *F16C 2360/22* (2013.01)

(58) Field of Classification Search
CPC ........ F16C 9/02; F16C 23/086; F16C 23/082; F16C 33/58; F16C 33/585; F16C 19/06; F16C 33/3837; F16C 2360/22
See application file for complete search history.

(56) References Cited

U.S. PATENT DOCUMENTS

| | | | | |
|---|---|---|---|---|
| 470,330 | A * | 3/1892 | Bersin ................... | F16C 19/386 384/589 |
| 1,332,444 | A * | 3/1920 | Lindman ............... | F16C 19/183 384/517 |
| 2,523,238 | A * | 9/1950 | Tarbutton .............. | F16C 19/163 384/495 |
| 3,441,327 | A * | 4/1969 | Peter ...................... | F16C 19/26 384/463 |
| 3,779,351 | A * | 12/1973 | Hentschel .............. | F16C 11/04 192/45.2 |
| 4,523,863 | A * | 6/1985 | Okoshi ................... | F16C 19/10 384/609 |

(Continued)

FOREIGN PATENT DOCUMENTS

| JP | 2008-196691 | | 8/2008 | |
|---|---|---|---|---|
| JP | 2009250031 | A * | 10/2009 | ............. F16C 19/06 |

OTHER PUBLICATIONS

Machine Translation of JP 2009-250031 (Year: 2009).*

*Primary Examiner* — Alan B Waits

(74) *Attorney, Agent, or Firm* — Wenderoth, Lind & Ponack, L.L.P.

(57) ABSTRACT

A rolling bearing includes an outer ring supported by a fixed body, an inner ring which supports a rotating shaft, and rolling elements between an inner groove of the outer ring and an outer groove of the inner ring, wherein a curvature radius R of at least the inner groove of the outer ring is in a range of $2r \times 0.53 \leq R \leq 2r \times 0.55$ in relation to a radius r of one of the rolling elements.

5 Claims, 2 Drawing Sheets

(56) References Cited

U.S. PATENT DOCUMENTS

| | | | | |
|---|---|---|---|---|
| 5,207,514 A * | 5/1993 | Weissgerber | F16C 23/086 | 384/497 |
| 5,324,119 A * | 6/1994 | Harimoto | F16C 19/46 | 384/548 |
| 5,800,072 A * | 9/1998 | Buch | F16C 19/36 | 384/568 |
| 5,882,124 A * | 3/1999 | Diemer | F16C 19/48 | 384/570 |
| 6,033,122 A * | 3/2000 | Kellstrom | F16C 23/08 | 384/563 |
| 6,158,896 A * | 12/2000 | Zernickel | F16C 33/60 | 384/506 |
| 6,227,711 B1 * | 5/2001 | Kellstrom | F16C 33/36 | 384/450 |
| 9,303,689 B2 * | 4/2016 | Swartley | F16C 33/37 | |
| 2002/0054721 A1 * | 5/2002 | Yoshida | F16C 19/163 | 384/523 |
| 2005/0105838 A1 * | 5/2005 | Brauer | F16C 19/20 | 384/492 |
| 2005/0180671 A1 * | 8/2005 | Tibbits | C10M 125/04 | 384/462 |
| 2006/0013519 A1 * | 1/2006 | Fukunaga | F16C 19/166 | 384/450 |
| 2007/0272075 A1 * | 11/2007 | Nathan | F04B 1/148 | 91/499 |
| 2009/0268994 A1 * | 10/2009 | Kawashima | F16C 25/08 | 384/43 |
| 2011/0186005 A1 * | 8/2011 | Lemke | F01B 7/04 | 123/197.1 |
| 2011/0306429 A1 * | 12/2011 | Mikami | C10M 129/14 | 464/7 |
| 2012/0275739 A1 * | 11/2012 | Couillard | F16C 33/58 | 384/515 |
| 2013/0266251 A1 * | 10/2013 | Friedrich | F16C 33/4623 | 384/470 |
| 2015/0211578 A1 * | 7/2015 | Wensing | F16C 33/585 | 384/492 |
| 2015/0308500 A1 * | 10/2015 | Swartley | F16C 33/37 | 384/492 |
| 2016/0061254 A1 * | 3/2016 | Varnoux | F16C 35/077 | 310/90 |
| 2016/0273584 A1 * | 9/2016 | Braun | F16C 19/06 | |
| 2016/0319863 A1 * | 11/2016 | Niarfeix | F16C 19/18 | |
| 2017/0241476 A1 * | 8/2017 | Moratz | F16C 33/3806 | |

* cited by examiner

ROLLING BEARING

CROSS-REFERENCE TO RELATED APPLICATION

The present application claims priority to and incorporates by reference the entire contents of Japanese Patent Application No. 2017-200492 filed in Japan on Oct. 16, 2017.

FIELD

The present application relates to a rolling bearing that supports a rotating shaft, and especially relates to a rolling bearing that receives a heavy load for supporting a rotating shaft in a cantilevered manner.

BACKGROUND

A conventional rolling bearing described in Japanese Patent Application Publication No. 2008-196691 is a means for supporting a crank shaft or the like of an automobile engine in order to solve a sudden increase in rotational torque thereof when a misalignment equal to or larger than an inclination angle allowed in the bearing occurs, the misalignment being caused by an installation defect or the like due to machining accuracy of an engine housing thereof. This rolling bearing is a rolling bearing in which rolling elements are arranged between respective orbital planes formed on an outer peripheral surface of an inner member and an inner peripheral surface of an outer member, and that is usable in a state where shaft centers of an inner member thereof and an outer member thereof are inclined from each other by 0.1 [deg] or more when radial load is applied thereto. A radial clearance $\Delta$ [mm] thereof is in a relation of $dm \times 10^{-3} < \Delta < 2dm \times 10^{-3}$ when a pitch diameter thereof is dm [mm].

SUMMARY

A rolling bearing according to the present application is assumed to be used in, for example, an environment where the rolling bearing receives a heavy load by supporting a rotating shaft in a cantilevered manner and excessive radial load is caused. In such an environment, inclination of the shaft centers is even larger in the rolling bearing described in Japanese Patent Application Publication No. 2008-196691, and thus even if the radial clearance is set as described above, increase in the rotational torque is difficult to be solved.

The present application solves the above described problem, and there is provided a rolling bearing that enables increase in rotational torque thereof to be solved even if a shaft center of a rotating shaft is largely inclined due to excessive radial load.

According to one aspect of the present application, there is provided rolling bearing, comprising an outer ring supported by a fixed body, an inner ring which supports a rotating shaft, and rolling elements arranged between an inner groove of the outer ring and an outer groove of the inner ring, wherein a curvature radius R of at least the inner groove of the outer ring among the inner groove of the outer ring and the outer groove of the inner ring is set in a range of $2r \times 0.53 \leq R \leq 2r \times 0.55$ in relation to a radius r of the rolling element.

In this rolling bearing, since at least an area of a contact ellipse in which the inner groove and the rolling element are in contact with each other is made comparatively small, the contact with the inner groove 2a and the rolling elements 4 and the contact with the outer groove 3a and the rolling elements 4 in a state where the rolling elements 4 are restrained are mitigated. As a result, increase in the rotational torque (friction torque) is able to be solved.

According to one aspect of the present application, there is provided a rolling bearing, comprising an outer ring supported by a fixed body, an inner ring which supports a rotating shaft, and rolling elements arranged between an inner groove of the outer ring and an outer groove of the inner ring, wherein a curvature radius R of at least the inner groove of the outer ring among the inner groove of the outer ring and the outer groove of the inner ring is set along a circumference of a circle with a radius corresponding to a first diameter of the rolling elements.

In this rolling bearing, the curvature radius R of at least the inner groove of the outer ring is equivalent to a radius of a circle around a portion at which the rolling element is in contact with the inner groove at the load side as a center, and the inner ring is inclined around the center as a fulcrum, and the rolling elements move along the inner groove; and thus the rolling elements are not restrained. As a result, increase in the rotational torque (friction torque) is able to be solved.

According to one aspect of the present application, there is provided a rolling bearing, comprising an outer ring supported by a fixed body, an inner ring which supports a rotating shaft, and rolling elements arranged between an inner groove of the outer ring and an outer groove of the inner ring, wherein a swing angle of the inner ring is set, and the rolling elements at an anti-load side are formed of an elastic member.

In this rolling bearing, by elastic deformation of the rolling elements, load due to the restraint is mitigated. As a result, increase in the rotational torque (friction torque) is able to be solved.

According to one aspect of the present application, there is provided a rolling bearing, comprising an outer ring supported by a fixed body, an inner ring which supports a rotating shaft, and rolling elements arranged between an inner groove of the outer ring and an outer groove of the inner ring, wherein a swing angle of the inner ring is set, and the rolling elements at an anti-load side are removed.

In this rolling bearing, the rolling elements restrained at the anti-load side are removed. As a result, increase in the rotational torque (friction torque) is able to be solved.

The above and other objects, features, advantages and technical and industrial significance of this application will be better understood by reading the following detailed description of presently preferred embodiments of the application, when considered in connection with the accompanying drawings.

DETAILED DESCRIPTION OF THE PREFERRED EMBODIMENTS

Hereinafter, embodiments according to the present application will be described in detail, based on the drawings. The application is not limited by these embodiments. Further, components in the following embodiments include any component that is easily substitutable by those skilled in the art or any component that is substantially the same.

First Embodiment

Figure 1:
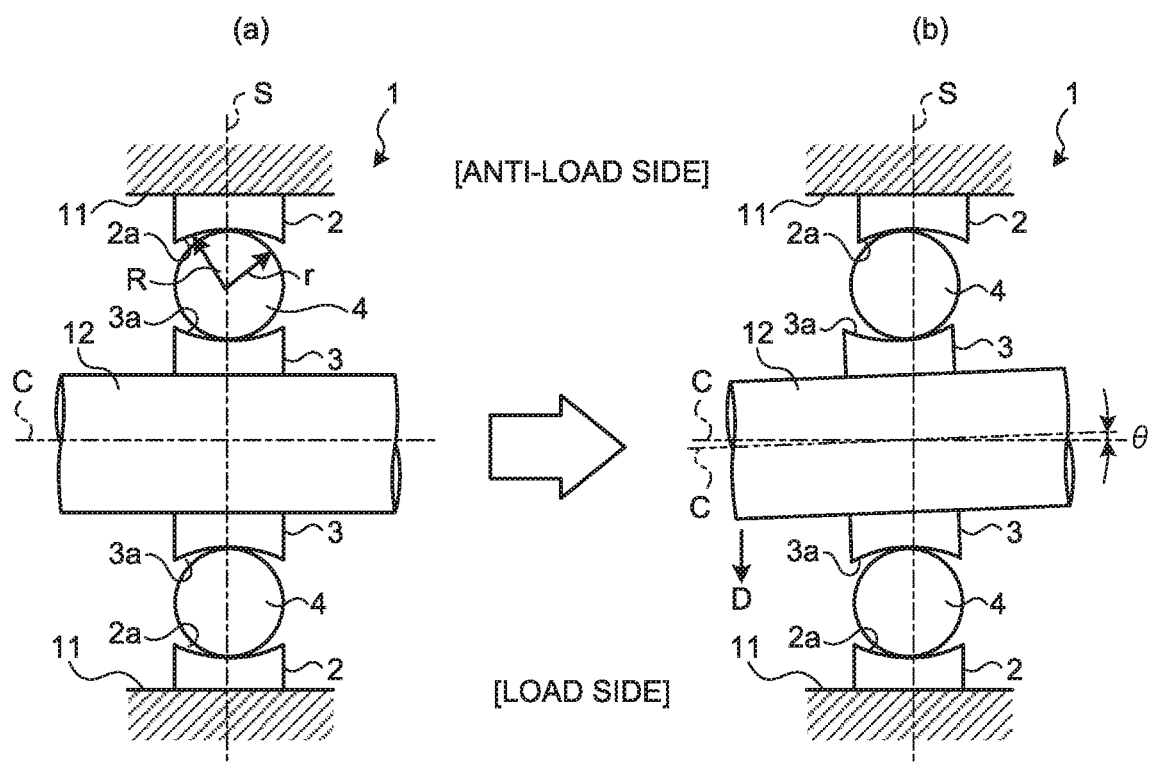
FIG. 1 is a schematic diagram of a rolling bearing according to a first embodiment of the present application.

FIG. 1 is a schematic diagram of a rolling bearing according to a first embodiment of the present application. As illustrated in FIG. 1, a rolling bearing 1 includes an outer ring 2 which is ring-shaped and supported by a fixed body 11, an inner ring 3 which is ring-shaped and supports a rotating shaft 12, and plural rolling elements 4 which are spherical and arranged along the ring-shaped outer ring 2 and the ring-shaped inner ring 3 between an inner groove 2a provided on an inner peripheral surface of the outer ring 2 and an outer groove 3a provided on an outer peripheral surface of the inner ring 3. That is, the rolling bearing 1 illustrated in FIG. 1 is configured as a ball bearing. Further, although not clearly illustrated in the drawings, the rolling bearing 1 has a holder provided therein, which holds the respective rolling elements 4 at a predetermined interval. Furthermore, although not clearly illustrated in the drawings, the rotating shaft 12 is connected to a driving unit such as a motor.

In this rolling bearing 1, a curvature radius R of the inner groove 2a of the outer ring 2 and that of the outer groove 3a of the inner ring 3 are set to be in a range of $2r \times 0.53 \leq R \leq 2r \times 0.55$ for a radius r of the rolling elements 4. In a general rolling bearing, a relation between a curvature radius R and a radius r is approximately in a range of $2r \times 0.51 \leq R \leq 2r \times 0.52$. However, the curvature radii R in the rolling bearing 1 according to this embodiment are set more largely than the general. In order to make the curvature radii R and the radius r satisfy the relation $2r \times 0.53 \leq R \leq 2r \times 0.55$, the curvature radii R are set more largely or the radius r is set smaller than the general.

Normally, as illustrated in FIG. 1(a), a shaft center C of the rotating shaft 12 is in a relation of being orthogonal to an axis S in a radial direction of the rolling bearing 1. From this state, as illustrated in FIG. 1(b), the rotating shaft 12 is inclined in a direction of an arrow D due to a weight of the rotating shaft 12, a weight of a structure rotated by the rotating shaft 12, an external force acting on the rotating shaft 12, and the like. This tends to occur when the rotating shaft 12 is supported in a cantilevered manner. In association with the inclination of the rotating shaft 12, the inner ring 3 is then inclined around a contact portion at which the rolling element 4 is in contact with the inner groove 2a at a load side as a fulcrum, and the rolling elements 4 are caught and restrained between a shoulder portion of the inner groove 2a of the outer ring 2 and a shoulder portion of the outer groove 3a of the inner ring 3 at an anti-load side, and thereby rotational torque (friction torque) is increased.

As described above, in the rolling bearing 1 according to this embodiment, the curvature radius R of the inner groove 2a of the outer ring 2 and that of the outer groove 3a of the inner ring 3 are set more largely than the general. Accordingly, an area of a contact ellipse in which the inner groove 2a of the outer ring 2 is in contact with the rolling element 4 and an area of a contact ellipse in which the outer groove 3a of the inner ring 3 is in contact with the rolling element 4 are smaller than the general. Therefore, the contact with the inner groove 2a and the rolling elements 4 and the contact with the outer groove 3a and the rolling elements 4 in a state where the rolling elements 4 are restrained are mitigated. As a result, increase in the rotational torque is able to be solved.

In particular, the rolling bearing 1 according to this embodiment provides a prominent effect in a case where an installation space for the rolling bearing is limited and increase in the rotational torque is unable to be solved by increase in size of the rolling bearing.

When the areas of the contact ellipses are decreased, a contact pressure by which the inner groove 2a of the outer ring 2 contacts the rolling element 4 and a contact pressure by which the outer groove 3a of the inner ring 3 contacts the rolling element 4 are increased. A rolling bearing having a maximum contact pressure equal to or larger than 4 [GPa] or 5 [GPa] is supposed as the rolling bearing 1 according to this embodiment. Further, a rolling bearing in which an inclination angle θ of the inner ring 3 is equal to or larger than $1 \times 10^{-2}$ [rad] is supposed as the rolling bearing 1 according to this embodiment.

In the above described embodiment, both of the curvature radius R of the inner groove 2a of the outer ring 2 and that of the outer groove 3a of the inner ring 3 are set as the above. However, increase in the rotational torque is able to be solved even if the curvature radius R of at least the inner groove 2a among the inner groove 2a of the outer ring 2 and the outer groove 3a of the inner ring 3 may be set as the above, since the area of the contact ellipse in which the rolling element 4 is in contact with the inner groove 2a is decreased, and the contact with the inner groove 2a and the rolling elements 4 in a state where the rolling elements 4 are restrained is able to be mitigated.

Further, in the above described embodiment, the curvature radius R of the inner groove 2a and that of the outer groove 3a are set as the above over the entire circumferences thereof. However, since the rolling elements 4 are restrained at the anti-load side, the curvature radius R of at least the inner groove 2a among the inner groove 2a and the outer groove 3a at the anti-load side may be set as the above.

Further, in the above described embodiment, the relation between the curvature radius R and the radius r is in a range of $2r \times 0.53 \leq R \leq 2r \times 0.55$. However, the relation may be in a range of $2r \times 0.53 \leq R$ in terms of decreasing the area of the contact ellipse in which the rolling element 4 is in contact with the inner groove 2a as much as possible. However, the shapes of the inner groove 2a and the outer groove 3a may be formed with the shoulder portions with small curvature radius R such that the rolling elements 4 do not come off from the shoulder portions. That is, by the relation between the curvature radius R and the radius r being in the range $2r \times 0.53 \leq R \leq 2r \times 0.55$, the rolling elements 4 are prevented from coming off from the shoulder portions of the inner groove 2a and the outer groove 3a.

Second Embodiment

Figure 2:
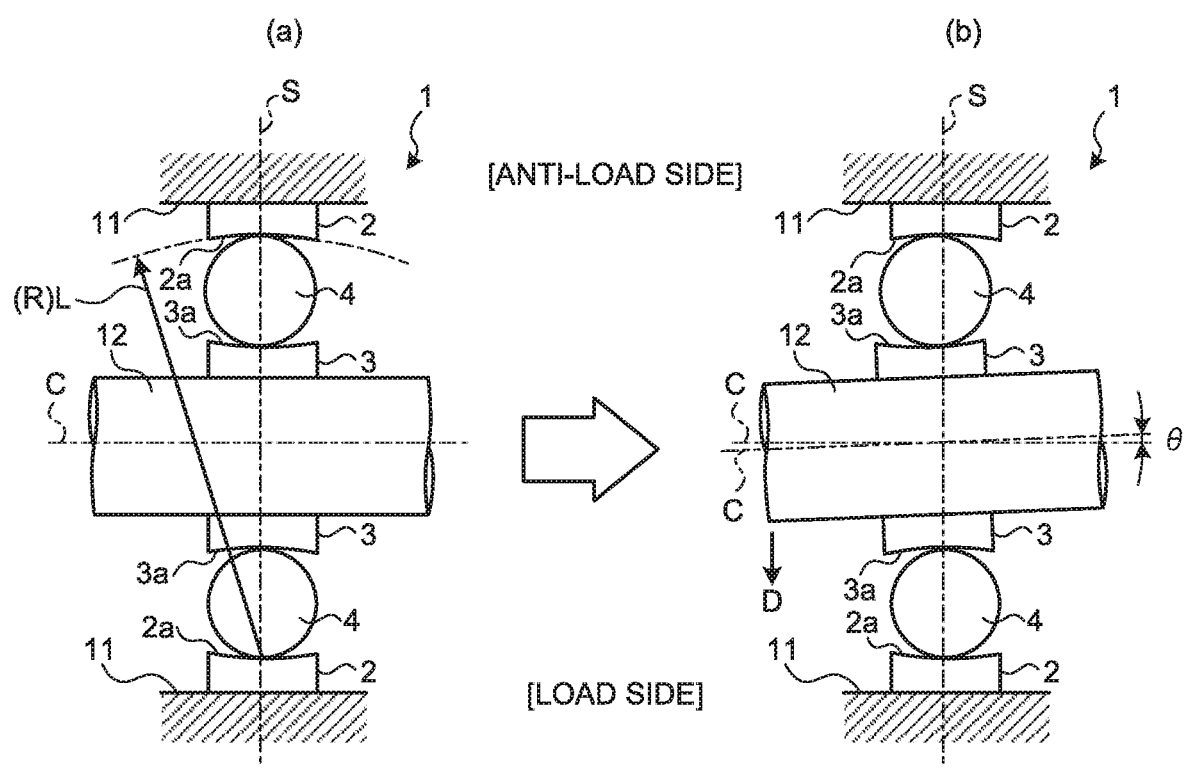
FIG. 2 is a schematic diagram of a rolling bearing according to a second embodiment of the present application.

FIG. 2 is a schematic diagram of a rolling bearing according to a second embodiment of the present application. As illustrated in FIG. 2, a rolling bearing 1 includes an outer ring 2 which is ring-shaped and supported by a fixed body 11, an inner ring 3 which is ring-shaped and supports a rotating shaft 12, and plural rolling elements 4 which are spherical and arranged along the ring-shaped outer ring 2 and the ring-shaped inner ring 3 between an inner groove 2a provided on an inner peripheral surface of the outer ring 2 and an outer groove 3a provided on an outer peripheral surface of the inner ring 3. That is, the rolling bearing 1 illustrated in FIG. 2 is configured as a ball bearing. Further, although not clearly illustrated in the drawings, the rolling bearing 1 has a holder provided therein, which holds the respective rolling elements 4 at a predetermined interval. Furthermore, although not clearly illustrated in the drawings, the rotating shaft 12 is connected to a driving unit such as a motor.

In this rolling bearing 1, a curvature radius R of the inner groove 2$a$ of the outer ring 2 and that of the outer groove 3$a$ of the inner ring 3 are set along a circumference of a circle with a radius corresponding to a first diameter of the rolling elements 4. The pitch radius L of the rolling elements 4 is, as illustrated in FIG. 2($a$), a diameter dimension in a radial direction of plural rolling elements 4 assembled in the outer ring 2 and the inner ring 3.

Normally, as illustrated in FIG. 2($a$), a shaft center C of the rotating shaft 12 is in a relation of being orthogonal to an axis S in a radial direction of the rolling bearing 1. From this state, as illustrated in FIG. 2($b$), the rotating shaft 12 is inclined in a direction of an arrow D due to a weight of the rotating shaft 12, a weight of a structure rotated by the rotating shaft 12, an external force acting on the rotating shaft 12, and the like. This tends to occur when the rotating shaft 12 is supported in a cantilevered manner. Conventionally, in association with the inclination of the rotating shaft 12, the inner ring 3 is then inclined around a contact portion at which the rolling element 4 is in contact with the inner groove 2$a$ at a load side as a fulcrum, and the rolling elements 4 are caught and restrained between a shoulder portion of the inner groove 2$a$ of the outer ring 2 and a shoulder portion of the outer groove 3$a$ of the inner ring 3 at an anti-load side, and thereby rotational torque (friction torque) is increased.

Thus, in the rolling bearing 1 according to this embodiment, as described above, the curvature radius R of the inner groove 2$a$ of the outer ring 2 and that of the outer groove 3$a$ of the inner ring 3 are set along the circumference of the circle with the radius corresponding to the first diameter of the rolling elements 4. That is, the curvature radius R of at least the inner groove of the outer ring is equivalent to a radius of a circle around a portion at which the rolling element is in contact with the inner groove at the load side as a center, and the inner ring is inclined around the center as a fulcrum. Therefore, the rolling elements 4 move along the inner groove 2$a$, and the rolling elements 4 are not restrained. As a result, increase in the rotational torque is able to be solved.

In particular, the rolling bearing 1 according to this embodiment provides a prominent effect in a case where an installation space for the rolling bearing is limited and increase in the rotational torque is unable to be solved by increase in size of the rolling bearing.

When the curvature radius R of the inner groove 2$a$ of the outer ring 2 and that of the outer groove 3$a$ of the inner ring 3 are set along the circumference of the circle with the radius corresponding to the first diameter of the rolling elements 4, an area of the contact ellipse in which the inner groove 2$a$ of the outer ring 2 is in contact with the rolling element 4 and an area of the contact ellipse in which the outer groove 3$a$ of the inner ring 3 is in contact with the rolling element 4 become smaller than the general. When the areas of the contact ellipses are decreased, a contact pressure by which the inner groove 2$a$ of the outer ring 2 contacts the rolling element 4 and a contact pressure by which the outer groove 3$a$ of the inner ring 3 contacts the rolling element 4 are increased. A rolling bearing having a maximum contact pressure equal to or larger than 4 [GPa] and less than 6 [GPa] is supposed as the rolling bearing 1 according to this embodiment. Further, a rolling bearing in which an inclination angle θ of the inner ring 3 is equal to or larger than $1 \times 10^{-2}$ [rad] is supposed as the rolling bearing 1 according to this embodiment.

In the above described embodiment, since the curvature radius R of the inner groove 2$a$ of the outer ring 2 and that of the outer groove 3$a$ of the inner ring 3 are set along the circumference of the circle with the radius corresponding to the first diameter of the rolling elements 4, the shapes of the inner groove 2$a$ and the outer groove 3$a$ may be formed with the shoulder portions with small curvature radius R such that the rolling elements 4 do not come off from the shoulder portions.

In the above described embodiment, both of the curvature radius R of the inner groove 2$a$ of the outer ring 2 and that of the outer groove 3$a$ of the inner ring 3 are set as the above. However, increase in the rotational torque is able to be solved even if the curvature radius R of at least the inner groove 2$a$ among the inner groove 2$a$ of the outer ring 2 and the outer groove 3$a$ of the inner ring 3 may be set as the above, since the rolling elements 4 move along the inner groove 2$a$.

Further, in the above described embodiment, the curvature radius R of the inner groove 2$a$ and that of the outer groove 3$a$ are set as the above over the entire circumferences thereof. However, since the rolling elements 4 are restrained at the anti-load side, the curvature radius R of at least the inner groove 2$a$ among the inner groove 2$a$ and the outer groove 3$a$ at the anti-load side may be set as the above.

Third Embodiment

Figure 3:
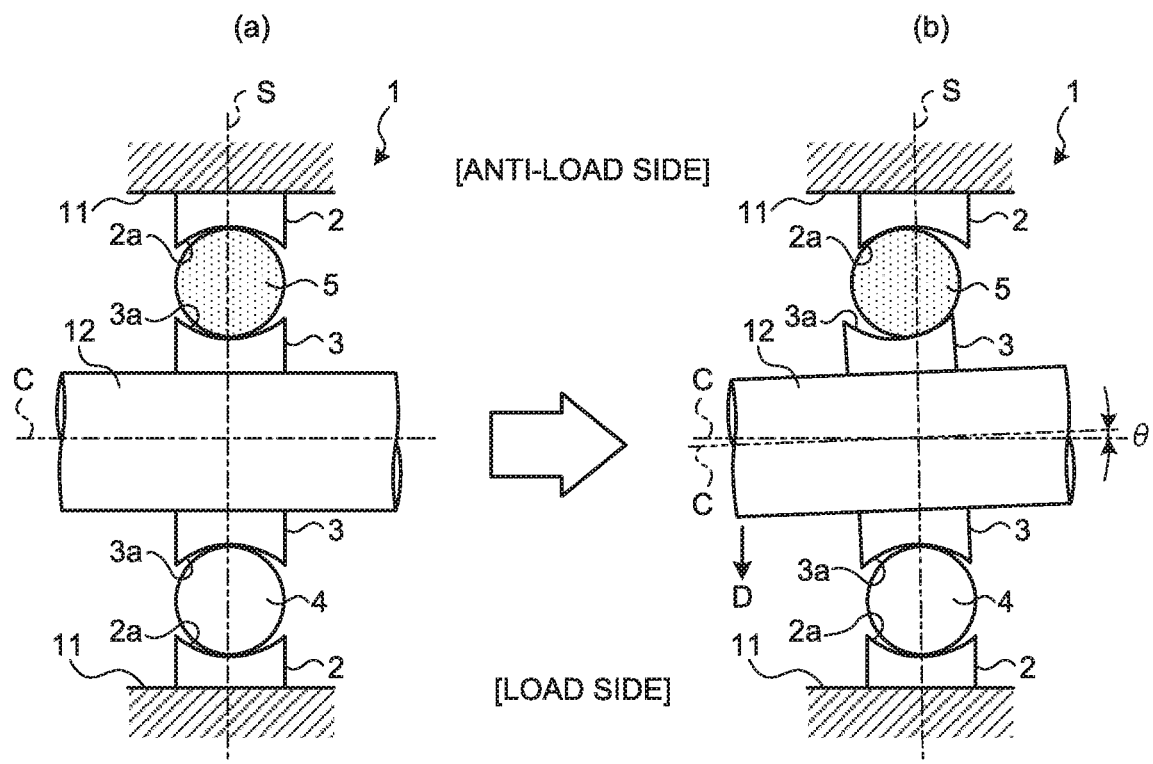
FIG. 3 is a schematic diagram of a rolling bearing according to a third embodiment of the present application.

FIG. 3 is a schematic diagram of a rolling bearing according to a third embodiment of the present application. As illustrated in FIG. 3, a rolling bearing 1 includes an outer ring 2 which is rig-shaped and supported by a fixed body 11, an inner ring 3 which is ring-shaped and supports a rotating shaft 12, and plural rolling elements 4 which are spherical and arranged along the ring-shaped outer ring 2 and the ring-shaped inner ring 3 between an inner groove 2$a$ provided on an inner peripheral surface of the outer ring 2 and an outer groove 3$a$ provided on an outer peripheral surface of the inner ring 3. That is, the rolling bearing 1 illustrated in FIG. 3 is configured as a ball bearing. Further, although not clearly illustrated in the drawings, the rolling bearing 1 has a holder provided therein, which holds the respective rolling elements 4 at a predetermined interval. Furthermore, although not clearly illustrated in the drawings, the rotating shaft 12 is connected to a driving unit such as a motor.

In this rolling bearing 1, a swing angle of the inner ring 3 is set. That is, the rotating shaft 12 is configured to swing in a predetermined range (for example, from −30° to 30°). In this configuration, the rolling bearing 1 has rolling elements 5 formed of an elastic member and arranged at an anti-load side away from a load region.

Normally, as illustrated in FIG. 3($a$), a shaft center C of the rotating shaft 12 is in a relation of being orthogonal to an axis S in a radial direction of the rolling bearing 1. From this state, as illustrated in FIG. 3($b$), the rotating shaft 12 is inclined in a direction of an arrow D due to a weight of the rotating shaft 12, a weight of a structure rotated by the rotating shaft 12, an external force acting on the rotating shaft 12, and the like. This tends to occur when the rotating shaft 12 is supported in a cantilevered manner. Conventionally, in association with the inclination of the rotating shaft 12, the inner ring 3 is then inclined around a contact portion at which the rolling element 4 is in contact with the inner groove 2a at a load side as a fulcrum, and the rolling elements 4 are caught and restrained between a shoulder portion of the inner groove 2a of the outer ring 2 and a shoulder portion of the outer groove 3a of the inner ring 3 at an anti-load side, and thereby rotational torque (friction torque) is increased.

Thus, as described above, the rolling bearing 1 according to this embodiment has the rolling elements 5 formed of the elastic member and arranged at the anti-load side. Therefore, by elastic deformation of the rolling elements 5, load due to restraint of the rolling elements 5 is mitigated. As a result, increase in the rotational torque is able to be solved.

In particular, the rolling bearing 1 according to this embodiment provides a prominent effect in a case where an installation space for the rolling bearing is limited and increase in the rotational torque is unable to be solved by increase in size of the rolling bearing.

A rolling bearing having a maximum contact pressure equal to or larger than 4 [GPa] by which the inner groove 2a of the outer ring 2 and the outer groove 3a of the inner ring 3 contact the rolling elements 4 is supposed as the rolling bearing 1 according to this embodiment. Further, a rolling bearing in which an inclination angle θ of the inner ring 3 is equal to or larger than $1 \times 10^{-2}$ [rad] is supposed as the rolling bearing 1 according to this embodiment.

Fourth Embodiment

Figure 4:
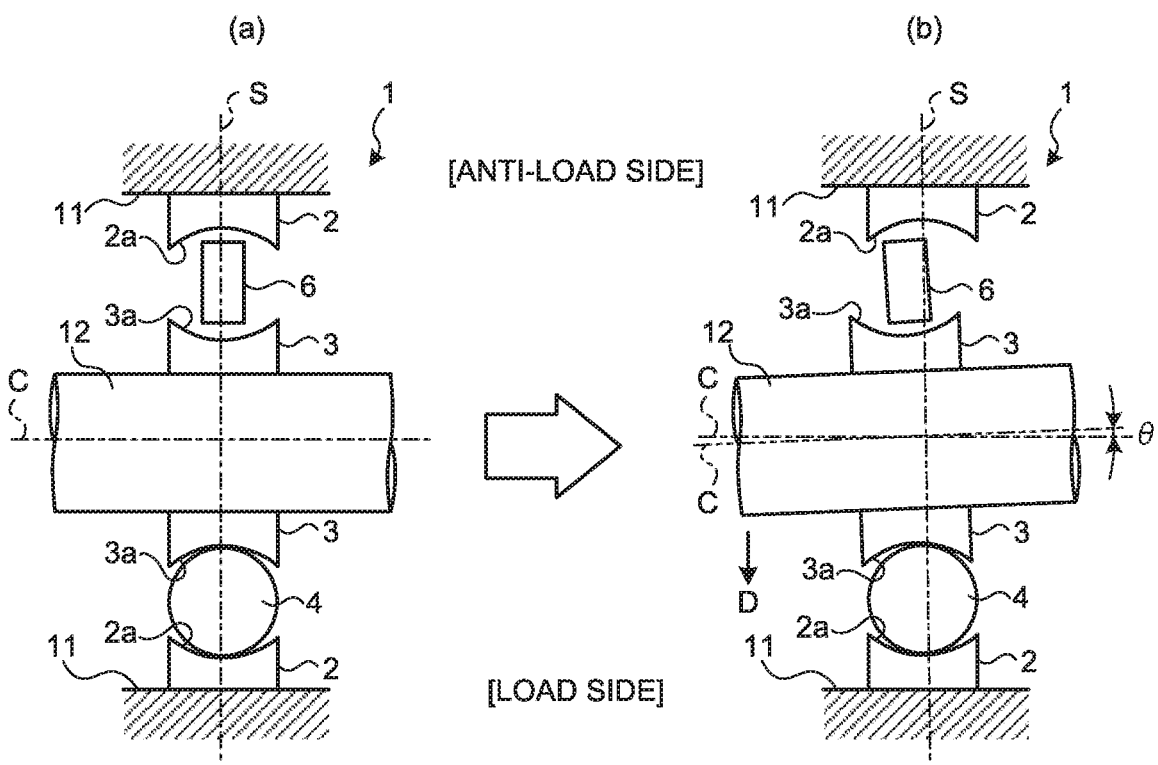
FIG. 4 is a schematic diagram of a rolling bearing according to a fourth embodiment of the present application.

FIG. 4 is a schematic diagram of a rolling bearing according to a fourth embodiment of the present application. As illustrated in FIG. 4, a rolling bearing 1 includes an outer ring 2 which is ring-shaped and supported by a fixed body 11, an inner ring 3 which is ring-shaped and supports a rotating shaft 12, and plural rolling elements 4 which are spherical and arranged along the ring-shaped outer ring 2 and the ring-shaped inner ring 3 between an inner groove 2a provided on an inner peripheral surface of the outer ring 2 and an outer groove 3a provided on an outer peripheral surface of the inner ring 3. That is, the rolling bearing 1 illustrated in FIG. 4 is configured as a ball bearing. Further, although not clearly illustrated in the drawings, the rolling bearing 1 has a holder provided therein, which holds the respective rolling elements 4 at a predetermined interval. Furthermore, although not clearly illustrated in the drawings, the rotating shaft 12 is connected to a driving unit such as a motor.

In this rolling bearing 1, a swing angle of the inner ring 3 is set. That is, the rotating shaft 12 is configured to swing in a predetermined range (for example, from −30° to 30°). In this configuration, the rolling elements 4 at an anti-load side away from a load region are removed from the rolling bearing 1. In a portion where the rolling elements 4 are removed in the rolling bearing 1 of this embodiment, spacers 6 which do not contact with the outer ring 2 and the inner ring 3 are arranged. This spacer 6 corresponds, for example, to the above mentioned holder.

Normally, as illustrated in FIG. 1(a), a shaft center C of the rotating shaft 12 is in a relation of being orthogonal to an axis S in a radial direction of the rolling bearing 1. From this state, as illustrated in FIG. 1(b), the rotating shaft 12 is inclined in a direction of an arrow D due to a weight of the rotating shaft 12, a weight of a structure rotated by the rotating shaft 12, an external force acting on the rotating shaft 12, and the like. This tends to occur when the rotating shaft 12 is supported in a cantilevered manner. Conventionally, in association with the inclination of the rotating shaft 12, the inner ring 3 is then inclined around a contact portion at which the rolling element 4 is in contact with the inner groove 2a at a load side as a fulcrum, and the rolling elements 4 are caught and restrained between a shoulder portion of the inner groove 2a of the outer ring 2 and a shoulder portion of the outer groove 3a of the inner ring 3 at an anti-load side, and thereby rotational torque (friction torque) is increased.

Thus, as described above, since the rolling elements 4 at the anti-load side have been removed from the rolling bearing 1 according to this embodiment, the rolling elements 4 will not be restrained. As a result, increase in the rotational torque is able to be solved.

In particular, the rolling bearing 1 according to this embodiment provides a prominent effect in a case where an installation space for the rolling bearing is limited and increase in the rotational torque is unable to be solved by increase in size of the rolling bearing.

A rolling bearing having a maximum contact pressure equal to or larger than 4 [GPa] by which the inner groove 2a of the outer ring 2 and the outer groove 3a of the inner ring 3 contact the rolling elements 4 is supposed as the rolling bearing 1 according to this embodiment.

Further, a rolling bearing in which an inclination angle θ of the inner ring 3 is equal to or larger than $1 \times 10^{-2}$ [rad] is supposed as the rolling bearing 1 according to this embodiment.

According to the present application, increase in rotational torque in a case where a shaft center of a rotating shaft is inclined is able to be solved.

Although this application has been described with respect to specific embodiments for a complete and clear application, the appended claims are not to be thus limited but are to be construed as embodying all modifications and alternative constructions that may occur to one skilled in the art that fairly fall within the basic teaching herein set forth.

What is claimed is:

1. A rolling bearing, comprising:
   an outer ring supported by a fixed body;
   an inner ring which supports a rotation shaft; and
   rolling elements between an inner groove of the outer ring and an outer groove of the inner ring,
   wherein:
   a curvature radius R of the inner groove of the outer ring is in a range of 2r×0.53≤R≤2r×0.55 in relation to a radius r of a first of the rolling elements of the rolling bearing; and
   the inner ring is configured to be inclined around a contact portion at which a second of the rolling elements is in contact with the inner groove of the outer ring at a load side as a fulcrum.

2. The rolling bearing according to claim 1, wherein the first of the rolling elements is at an anti-load side.

3. A rolling bearing, comprising:
   an outer ring supported by a fixed body;
   an inner ring which supports a rotation shaft; and
   spherical rolling elements, in a row, between an inner groove of the outer ring and an outer groove of the inner ring,
   wherein:
   a curvature radius R of the inner groove of the outer ring is along a circumference of a circle with a radius corresponding to a pitch radius of the spherical rolling elements; and
   the inner ring is configured to be inclined around a contact portion at which one of the spherical rolling elements is in contact with the inner groove of the outer ring at a load side as a fulcrum.

4. A ball bearing, comprising:

an outer ring supported by a fixed body;

an inner ring which supports a rotation shaft; and spherical rolling elements that are arranged along the outer ring at predetermined intervals in a whole circumference and between an inner groove of the outer ring and an outer groove of the inner ring, wherein:

a rotation angle range of the rotation shaft is from −30 degrees to 30 degrees, and the spherical rolling elements only at an anti-load side are each formed of an elastic member.

5. A rolling bearing, comprising:

an outer ring supported by a fixed body;

an inner ring which supports a rotation shaft; and spherical rolling elements, in a row, between an inner groove of the outer ring and an outer groove of the inner ring, wherein:

a rotation angle range of the rotation shaft is from −30 degrees to 30 degrees, and the spherical rolling elements only at an anti-load side are removed; and the inner ring is configured to be inclined around a contact portion at which one of the spherical rolling elements is in contact with the inner groove of the outer ring at a load side as a fulcrum.

* * * * *